United States Patent
Ikebukuro

(10) Patent No.: US 10,952,421 B2
(45) Date of Patent: Mar. 23, 2021

(54) FISHING REEL

(71) Applicant: Shimano Inc., Osaka (JP)

(72) Inventor: Satoshi Ikebukuro, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 16/573,786

(22) Filed: Sep. 17, 2019

(65) Prior Publication Data

US 2020/0107528 A1    Apr. 9, 2020

(30) Foreign Application Priority Data

Oct. 5, 2018    (JP) .............................. JP2018-190253

(51) Int. Cl.
*A01K 89/01* (2006.01)
*A01K 97/00* (2006.01)
*A01K 89/015* (2006.01)

(52) U.S. Cl.
CPC .......... *A01K 97/00* (2013.01); *A01K 89/0192* (2015.05)

(58) Field of Classification Search
CPC ............ A01K 89/004; A01K 89/01121; A01K 89/0192; A01K 89/125
See application file for complete search history.

(56) References Cited

U.S. PATENT DOCUMENTS

| | | | | |
|---|---|---|---|---|
| 4,585,182 A * | 4/1986 | Atobe | ................ | A01K 89/0192 242/223 |
| 4,899,480 A * | 2/1990 | Park | ...................... | A01K 91/06 374/136 |
| 5,511,335 A * | 4/1996 | Langer | ................... | A01K 79/02 43/17.1 |
| 5,546,695 A * | 8/1996 | Langer | ................... | A01K 79/02 43/44.98 |
| 5,581,930 A * | 12/1996 | Langer | ................... | A01K 79/02 43/17 |
| 6,312,335 B1 * | 11/2001 | Tosaki | .................. | A63F 13/428 463/37 |
| 2005/0162976 A1 * | 7/2005 | Kuriyama | .......... | A01K 89/0192 367/111 |
| 2005/0211812 A1 * | 9/2005 | Nakagawa | ............. | A01K 89/00 242/223 |
| 2005/0218256 A1 * | 10/2005 | Ikuta | .................... | A01K 89/015 242/288 |
| 2010/0000143 A1 * | 1/2010 | Pekin | ................. | A01K 89/0192 43/17 |
| 2014/0358483 A1 * | 12/2014 | da Rosa | .................. | G01D 9/28 702/188 |

FOREIGN PATENT DOCUMENTS

JP    2014-100079 A    *  5/2014    .......... A01K 89/012
JP    2014-155460 A       8/2014

* cited by examiner

*Primary Examiner* — Emmanuel M Marcelo
(74) *Attorney, Agent, or Firm* — Global IP Counselors, LLP

(57) ABSTRACT

A fishing reel includes a reel body and a sensor unit. The reel body has a handle configured to be rotated about a handle axis. The sensor unit is attached to the reel body. The sensor unit includes a unit body disposed coaxially with the handle axis, a behavior sensor disposed within the unit body and configured to detect behavior when the reel body is used, and a communicator disposed within the unit body and configured to transmit behavior data to the outside based on the behavior detected by the behavior sensor.

6 Claims, 5 Drawing Sheets

FISHING REEL

CROSS-REFERENCE TO RELATED APPLICATIONS

This application claims priority to Japanese Patent Application No. 2018-190253, filed on Oct. 5, 2018. The entire disclosure of Japanese Patent Application No. 2018-190253 is hereby incorporated herein by reference.

BACKGROUND

Field of the Invention

The present invention relates to a fishing reel.

Background Art

A fishing reel that casts (unreels) a fishing line in a forward direction and that includes a sensor for detecting various types of information is known from the prior art. This type of sensor is attached at different positions as a function of, for example, the detection target, the sensor structure, etc., but is generally incorporated into the reel body.

On the other hand, reel stands for fishing reels are known, and can be considered as an attachment part that can be attached to the reel body. Reel stands can be attached to the reel body using the handle mounting portion for mounting the handle on the reel body, as shown, for example, in the following Japanese Published Unexamined Application No. 2014-155460.

SUMMARY

However, a technique for attaching a sensor or the like to the reel body is not known.

The present invention was conceived in light of these circumstances, and the object thereof is to provide a fishing reel equipped with a sensor unit that is attached to the reel body.

The fishing reel according to the present invention comprises a reel body having a handle that can be rotated about a handle axis, and a sensor unit (or sensor) attached to the reel body, wherein the sensor unit includes a unit body disposed coaxially to the handle axis, a behavior sensor disposed within the unit body and that detects the behavior of the reel body during use, and a communication unit (communicator) disposed within the unit body and that transmits behavior data based on the behavior detected by the behavior sensor to the outside.

With the fishing reel of the present embodiment, it is possible to transmit behavior data based on the behavior of the reel body detected by the behavior sensor to the outside by the communication unit of the sensor unit. Thus, for example, it is possible for the behavior data to be transmitted to an external device or the like in real time as one fishes. Accordingly, the behavior of the reel body based on the behavior data can be objectively ascertained and, for example, utilized during subsequent fishing.

In particular, since the sensor unit itself can be disposed on the handle axis, for example, behavior accompanying an operation of the handle can be suitably detected, and it is possible to detect, based on the behavior data, rotational irregularities, for example, with high accuracy.

The behavior sensor and the communication unit may be arranged so as to be aligned along the handle axis.

In this embodiment, since the behavior sensor and the communication unit, which require installation space, are arranged so as to be aligned along the handle axis, it is possible to prevent enlargement of the unit body, which houses these components, in a direction that intersects the handle axis. Thus, it is a simple matter to prevent the sensor unit from interfering with other constituent components (rotor, etc.) of the fishing reel.

The sensor unit may further include a data storage for the storage of the behavior data, which is disposed within the unit body.

In this embodiment, since the behavior data can also be stored in the data storage of the sensor unit, for example, even after one stops fishing, the behavior data can be acquired by an external device or the like by removing the sensor unit from the reel body and accessing the data storage.

A pair of handle mounting portions (e.g., first and a second mounting portions) for mounting the handle can be formed on the reel body coaxially with the handle axis so as to open toward the outside, the unit body can be attached to the reel body by one of the handle mounting portions (e.g., the first mounting portion), and the handle can be attached to the reel body by the other one of handle mounting portions (e.g., the second mounting portion).

In this embodiment, since it is possible to attach the sensor unit using the handle mounting portion for mounting the handle on the reel body, it is not necessary to add a special structure on the reel body side. Accordingly, for example, it is possible to utilize the existing reel body, so that it is possible to improve convenience of use and easily reduce the cost.

The handle can have a handle shaft that is supported by the reel body so as to be rotatable about the handle axis, and the unit body can be attached to the reel body so as to be non-rotationally fixed by one of the handle mounting portions in a state in which the unit body is not in contact with the handle shaft.

In this embodiment, since the sensor unit can be attached to the reel body so as to be non-rotationally fixed, one may fish without worrying about the sensor unit. Moreover, since it is difficult for a centrifugal force and other stresses that accompany the operation of the handle to act on each of the components inside the unit body, long-term stable operating reliability can be ensured.

The handle may have a handle shaft that is supported by the reel body so as to be rotatable about the handle axis, and the unit body may include a connecting shaft portion that is connected to the handle shaft by one of the handle mounting portions, and that is attached to the reel body so as to be non-rotationally fixed.

In this embodiment, since the sensor unit itself can be rotated together with an operation of the handle, the behavior that accompanies the handle operation can be suitably detected.

With the present invention, a fishing reel that is equipped with a sensor unit that is attached to the reel body can be obtained.

DETAILED DESCRIPTION OF EMBODIMENTS

First Embodiment

A first embodiment of the fishing reel according to the present invention will be described with reference to the drawings. In the present embodiment, a spinning reel is described as an example of a fishing reel.

Figure 1:
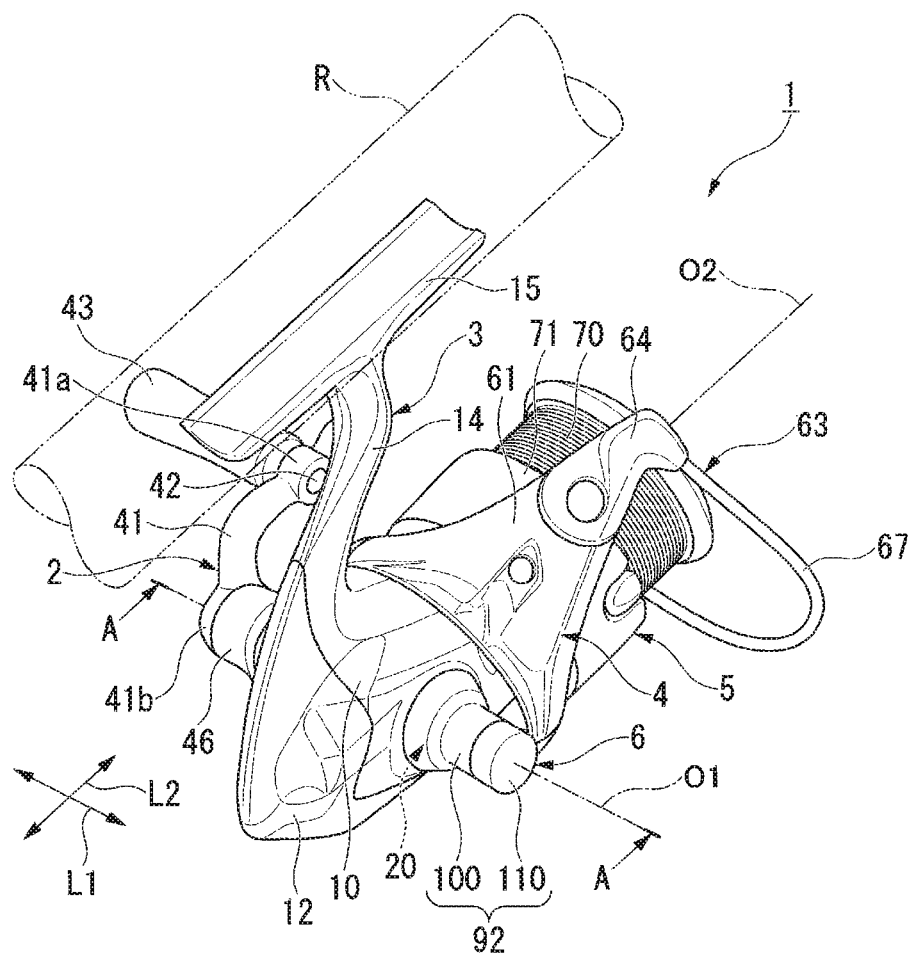
FIG. 1 is a side view of a spinning reel (fishing reel) in a first embodiment of the present invention.
Figure 2:
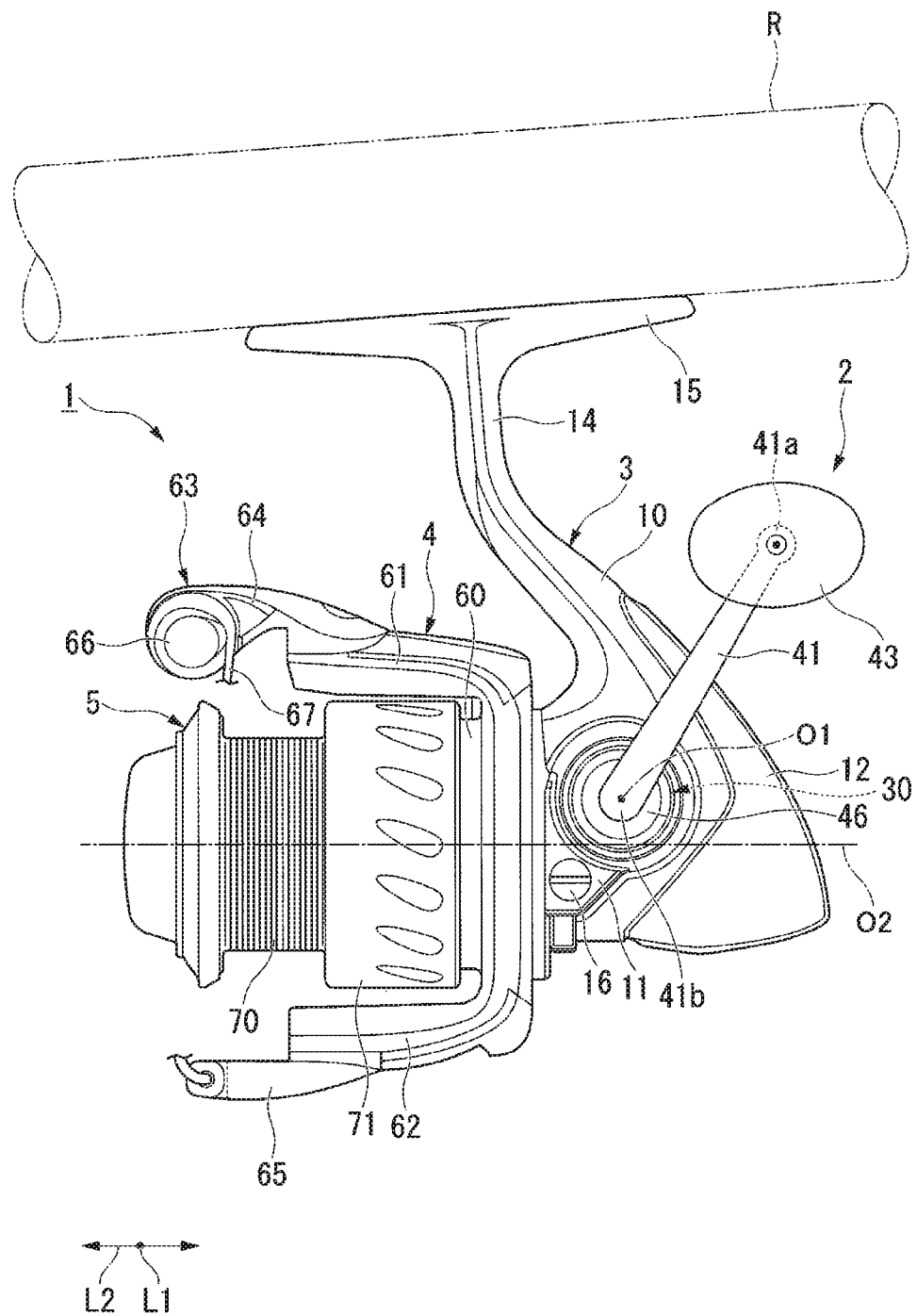
FIG. 2 is aside view of the spinning reel shown in FIG. 1.
Figure 3:
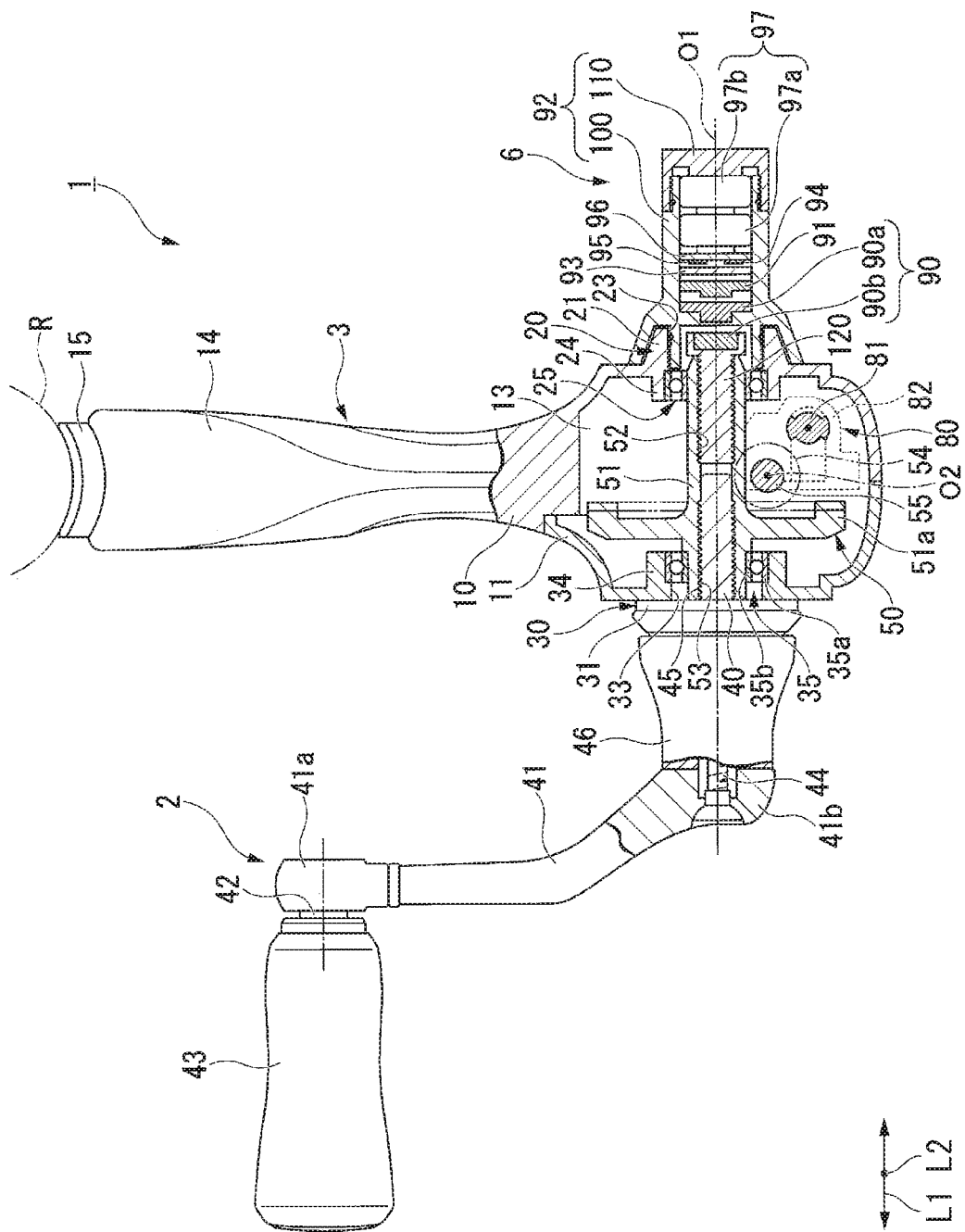
FIG. 3 is a partial cross-sectional view of the spinning reel through line A-A in FIG. 1.

As shown in FIGS. 1-3, the spinning reel 1 of the present embodiment primarily comprises a reel body 3 that has a handle assembly (handle according to the present invention) 2 that can rotate about a handle axis O1 and that can be mounted on a rod R; a rotor 4 that is combined with the reel body 3 so as to be rotatable about a spool axis O2; a spool 5 that is combined with the reel body 3 so as to be capable of moving along the spool axis O2 in reciprocating fashion and around which is wound a fishing line, not shown; and a sensor unit (sensor) 6 that is detachably attached to the reel body 3.

The handle axis O1 and the spool axis O2 intersect so as to be essentially orthogonal to each other. In the present embodiment, the direction along the handle axis O1 is defined as the left-right direction L1 and the direction along the spool axis O2 is defined as the longitudinal direction L2. In addition, the direction in which the fishing line is cast (unreeled) from the spool 5 in the longitudinal direction L2 is defined as the front, the opposite direction is defined as the rear, and left and right are defined according to a rear view of the spinning reel 1 (that is, as seen from the point of view of the user, who is not shown).

Furthermore, the direction that intersects the handle axis O1 as seen from the handle axis O1 direction may be referred to as the radial direction, and the direction encircling the handle axis O1 may be referred to as the circumferential direction. Furthermore, the radial direction from the handle axis O1 to the fishing rod R is referred to as upward, and the opposite direction is referred to as downward.

Reel Body

The reel body 3 comprises a body frame portion 10, a lid part 11, and a guard member 12. The body frame portion 10 is a molded part made from a light alloy such as a magnesium alloy or an aluminum alloy, and a housing space 13 for housing various reel component members is formed therein. A leg portion 14 is integrally formed on the upper portion of the body frame portion 10 so as to extend upwardly. A mounting piece 15 for mounting to the fishing rod R is formed at the upper end portion of the leg portion 14 so as to extend along the fishing rod R.

The fishing rod R shown in FIGS. 1 to 3 is illustrated schematically, and illustrations of configurations such as that of a reel attachment pedestal (reel seat), which are generally disposed on the fishing rod R, are omitted.

The lid part 11 is a molded piece made from a light alloy similar to that of the body frame portion 10 and is detachably fixed to the body frame portion 10. The housing space 13 is closed by the lid part 11 so as to be, for example, tight (liquid tight, airtight, etc.). The method of fixing the lid part 11 to the body frame portion 10 is not particularly limited and can entail the utilization of a plurality of fixing bolts, for example, including a fixing bolt 16 that is disposed in a portion of the body frame portion 10 that is positioned on the rear side of the rotor 4.

The guard member 12 is a cover part that covers the rear portion of the body frame portion 10 and the rear portion of the lid part 11 from the rear side. However, the guard member 12 is not an essential component, and thus need not be provided. The guard member 12 is detachably fixed toward the rear portion of the body frame portion 10 with a fixing bolt, not shown.

As shown in FIG. 3, a pair of handle mounting portions for mounting the handle assembly 2, that is, a first handle mounting portion 20 and a second handle mounting portion 30, are formed on the reel body 3 coaxially to the handle axis O1 so as to be open toward the outside. The first handle mounting portion 20 is formed on the right-hand side surface of the body frame portion 10, and the second handle mounting portion 30 is formed on the left-hand side surface of the lid part 11.

Figure 4:
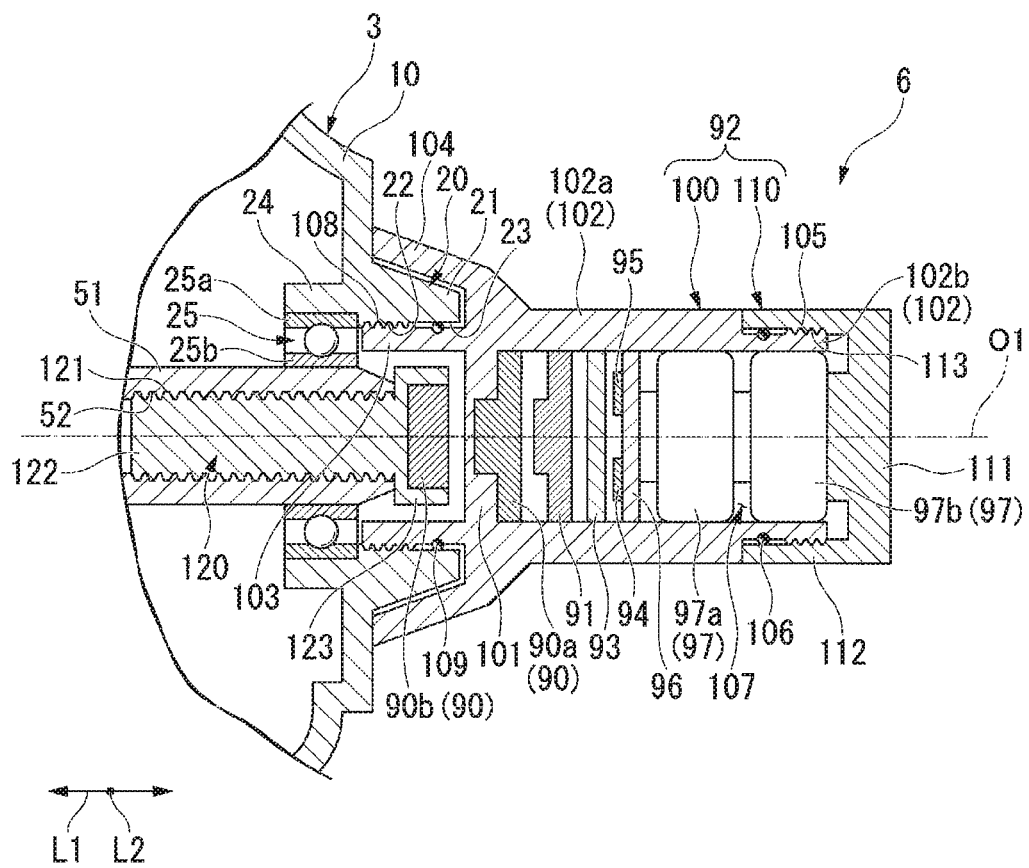
FIG. 4 is an enlarged cross-sectional view of the periphery of a sensor unit shown in FIG. 3.

As shown in FIGS. 3 and 4, the first handle mounting portion 20 is formed so as to project from the right-hand side surface of the body frame portion 10 toward the right side of the body frame portion 10, and includes a cylindrical first mounting cylinder 21, which is disposed coaxially to the handle axis O1, and a first threaded portion 22 (for example, male threads) formed on the inner circumferential surface of the first mounting cylinder 21. The interior of the first mounting cylinder 21 is a first mounting hole 23 that connects the interior of the housing space 13 to the outside.

In addition, a cylindrical first holding cylinder 24, which is disposed coaxially with the handle axis O1 and which is formed to project toward the interior of the housing space 13, is formed on the right-hand side surface of the body frame portion 10. A first shaft bearing 25 disposed coaxially with the handle axis O1 is attached to the interior of the first holding cylinder 24.

The first shaft bearing 25 is a ball bearing, for example, and is held by the reel body 3 via the first holding cylinder 24 by firmly fitting an outer race 25a to the inside of the first holding cylinder 24. The first shaft bearing 25 is attached to the inside of the first holding cylinder 24 while positioned in the left-right direction L1.

As shown in FIG. 3, the second handle mounting portion 30 is formed so as to project from the left-hand side surface of the lid part 11 toward the left side of the body frame portion 10 and includes a cylindrical second mounting cylinder 31 disposed coaxially to the handle axis O1, and a second threaded portion (for example, male threads), not shown, formed on the inner circumferential surface of the second mounting cylinder 31. The second mounting cylinder 31 can have the same diameter as the first mounting cylinder 21. Therefore, the thread diameter of the first threaded portion 22 and the thread diameter of the second threaded portion are the same.

The interior of the second mounting cylinder 31 is a second mounting hole 33 that connects the interior of the housing space 13 to the outside. The first mounting hole 23 and the second mounting hole 33 are arranged so as to face each other in the left-right direction L1 across the housing space 13 and are arranged coaxially with the handle axis O1.

In addition, a cylindrical second holding cylinder 34, which is disposed coaxially to the handle axis O1 and which is formed to project toward the inside of the housing space 13, is formed on the left-hand side surface of the lid part 11. A second shaft bearing 35, which is disposed coaxially to the handle axis O1, is attached to the inside of the second holding cylinder 34.

The second shaft bearing 35 is a ball bearing, for example, and is held by the reel body 3 via the second holding cylinder 34 by firmly fitting an outer race 35a to the inside of the second holding cylinder 34. The second shaft bearing 35 is attached to the inside of the second holding cylinder 34 while being positioned in the left-right direction L1.

The handle assembly 2 and the sensor unit 6 are attached to the reel body 3 using the first handle mounting portion 20 and the second handle mounting portion 30 described above. Specifically, the sensor unit 6 is attached to the right side of the reel body 3 using the first handle mounting portion 20, and the handle assembly 2 is attached to the left side of the reel body 3 using the second handle mounting portion 30.

Thus, the spinning reel 1 according to the present embodiment is an example of a left-handle spinning reel. However, the invention is not limited to this embodiment: by attaching the handle assembly 2 using the first handle mounting portion 20 and by attaching the sensor unit 6 using the second handle mounting portion 30, the spinning reel can be switched to right-handle mode.

Handle Assembly

As shown in FIG. 3, the handle assembly 2 comprises a handle shaft 40 that is supported so as to be rotatable about the handle axis O1 with respect to the reel body 3, a handle arm 41 that is connected to the handle shaft 40 and that is attached to the reel body 3 via the handle shaft 40 so as to be rotatable about the handle axis O1, a knob shaft 42 that is fixed to a distal end portion 41a of the handle arm 41, and a handle knob 43 that is rotatably attached to the knob shaft 42.

The handle arm 41 extends in the radial direction of the handle axis O1, and the proximal end portion 41b thereof is disposed on the left side of the lid part 11. The handle shaft 40 is integrally connected to the proximal end portion 41b of the handle arm 41 via, for example, a coupling screw 44, and is inserted into the reel body 3 from the left side through the second mounting hole 33 in a state of coaxial disposition with the first axis O1. The handle shaft 40 is integrally connected to a cylindrical drive shaft 51 that constitutes a rotor drive mechanism 50 via threaded attachment to the inside the drive shaft 51, for example.

The drive shaft 51 will now be described.

The drive shaft 51 is a metal cylindrical part made by cold forging, for example, that is disposed coaxially to the handle axis O1, both ends of which are open in the left-right direction L. The right-end portion of the drive shaft 51 is disposed within the first mounting hole 23 and firmly fitted to the inside of an inner race 25b of the first shaft bearing 25. The left-end portion of the drive shaft 51 is disposed within the second mounting hole 33 and firmly fits to the inside of an inner race 35b of the second shaft bearing 35.

As a result, the drive shaft 51 is supported by the first shaft bearing 25 and the second shaft bearing 35 so as to be rotatable about the handle axis O1 and is held by the reel body 3 via the first shaft bearing 25 and the second shaft bearing 35.

A third threaded portion 52 (for example, a female threaded portion) is disposed on the inner circumferential surface of the right-end portion of the drive shaft 51. A fourth threaded portion 53 (for example, a female threaded portion) is disposed on the inner circumferential surface of the left-end portion of the drive shaft 51. The thread diameter of the third threaded portion 52 and the thread diameter of the fourth threaded portion 53 are the same.

With respect to the drive shaft 51 configured as described above, a fifth threaded portion 45 (for example, a male threaded portion) that can be screwed into both the third threaded portion 52 and the fourth threaded portion 53 is disposed on the outer circumferential surface of the handle shaft 40.

The handle shaft 40 is then screwed into the drive shaft 51 by insertion into the inside of the drive shaft 51 and screwing the fifth threaded portion 45 into the fourth threaded portion 53 of the drive shaft 51. The handle shaft 40 is thereby integrally combined with the drive shaft 51. As a result, the handle assembly 2 is attached to the reel body 3 via the drive shaft 51 so as to be rotatable about the handle axis O1.

A handle collar 46 is disposed between the lid part 11 and the proximal end portion 41b of the handle arm 41. The handle collar 46 has a cylindrical shape that covers the second mounting cylinder 31 and a portion of the handle shaft 40 that is positioned between the lid part 11 and the proximal end portion 41b of the handle arm 41 from the radially outer side. The handle collar 46 is rotatable about the handle axis O1 together with the proximal end portion 41b of the handle arm 41.

The knob shaft 42 is fixed to the distal end portion 41a of the handle arm 41 such that the axis thereof is essentially parallel to the handle axis O1. The handle knob 43 is attached to the knob shaft 42 so as to be rotatable and is attached to the distal end portion 41a of the handle arm 41 via the knob shaft 42.

In the handle assembly 2 configured as described above, the handle shaft 40 can be pulled out from the drive shaft 51 and detached from the second handle mounting portion 30 while releasing the threaded engagement between the fourth threaded portion 53 and the fifth threaded portion 45. Then, with the handle assembly 2 reattached on the first handle mounting portion 20 side, it is possible to switch to the right-handle mode.

In this embodiment, the handle shaft 40 should be inserted into the reel body 3 from the right side through the first mounting hole 23, and the fifth threaded portion 45 should be screwed into the third threaded portion 52 of the drive shaft 51. It is thereby possible to fit the handle shaft 40 inside the drive shaft 51 and to integrally combine the handle shaft 40 and the drive shaft 51.

Moreover, in the right-handle mode, with the handle assembly 2 attached to the first handle mounting portion 20, the second handle mounting portion 30 can be used to attach the sensor unit 6 to the left side of the reel body 3.

Rotor

As shown in FIGS. 1 and 2, the rotor 4 is disposed on the front side of the reel body 3 coaxially to the spool axis O2 and comprises a cylindrical body 60, which is formed with a topped cylinder shape, and a first arm portion 61 and a second arm portion 62, which are connected to the cylindrical body 60.

The cylindrical body 60 is open at the rear and is combined with the reel body 3 from the front side so as to surround the front portion side of the reel body 3 from the outside in the radial direction. The rotor 4 is thereby combined with the reel body 3 so as to be rotatable about the spool axis O2.

The first arm portion 61 and the second arm portion 62 are disposed opposite each other in the radial direction across the spool axis O2. A bail arm 63 is rotatably (pivotally) attached to the front-end portion of the first arm portion 61 and the front-end portion of the second arm portion 62.

The bail arm 63 includes a first bail support member 64 that is rotatably attached to the front-end portion of the first arm portion 61, a second bail support member 65 that is rotatably attached to the front-end portion of the second arm portion 62, a line roller 66 that is rotatably attached to the front-end portion of the first bail support member 64, and a bail 67 that is curved in an essentially U-like shape and disposed so as to connect the space between the first bail support member 64 and the second bail support member 65.

One end portion of the bail 67 is fixed to the front-end portion of the first bail support member 64 via the line roller 66, and the other end portion thereof is fixed to the front-end portion of the second bail support member 65. The line roller 66 guides the fishing line to the spool 5.

Spool

The spool 5 comprises a bobbin trunk 70, around which the fishing line is wound, and a cylindrical skirt portion 71 that extends from the rear-end portion of the bobbin trunk 70 rearward and surrounds the rotor 4 from the outer side in the radial direction and is disposed on the front side of the rotor 4 coaxially to the second axis O2.

The spool 5 is disposed such that the bobbin trunk 70 is positioned between the first arm portion 61 and the second arm portion 62, and is configured to be capable of moving in reciprocating fashion along the spool axis O2 by an oscillating mechanism 80. The spool 5 is thereby configured to move in reciprocating fashion along the spool axis O2 with respect to the reel body 3.

As shown in FIG. 3, a rotor drive mechanism 50 that rotates the rotor 4 about the spool axis O2 with the rotation of the handle assembly 2, the oscillation mechanism 80 that moves the spool 5 in reciprocating fashion in the direction of the spool axis O2 (longitudinal direction) with the rotation of the handle assembly 2, and an anti-reverse rotation mechanism, not shown, that prevents the reverse rotation of the rotor 4 are further disposed within the housing space 13 of the reel body 3.

Rotor Drive Mechanism

The rotor drive mechanism 50 is mainly composed of the above-described drive shaft 51, a drive gear 51a formed on the drive shaft 51, and a pinion gear 54 that meshes with the drive gear 51a and that rotates about the spool axis O2 along with the rotation of the drive shaft 51.

The pinion gear 54 is integrally formed with a cylindrical pinion shaft, not shown, that is disposed coaxially to the spool axis O2. The pinion shaft is arranged, for example, to be positioned below and in front of the drive shaft 51 and is integrally coupled to the rotor 4. It is thereby possible to rotate the rotor 4 about the spool axis O2 via the pinion gear 54 and the pinion shaft.

Therefore, the rotor drive mechanism 50 can transmit the rotational force that is generated by the rotation of the handle assembly 2 to the rotor 4. The spool shaft 55 is inserted on the inner side of the pinion shaft so as to be relatively movable in the spool axis O2 direction.

Oscillation Mechanism

The oscillating mechanism 80 comprises an intermediate gear, not shown, that meshes with the pinion gear 54, a threaded shaft 81 that is disposed parallel to the spool shaft 55, and a slider 82 that reciprocates along the threaded shaft 81 as the threaded shaft 81 rotates.

The intermediate gear and the threaded shaft 81 can be rotated as the pinion gear 54 rotates. The slider 82 is coupled to the spool shaft 55 in a non-rotationally fixed manner. As a result, it is possible to move the slider 82 in reciprocating fashion along the threaded shaft 81 as the threaded shaft 81 rotates and to move the spool shaft 55, which is fixed to the slider 82, in reciprocating fashion along the spool axis O2.

Thus, the oscillation mechanism 80 is able to convert the rotational force that is generated by the rotation of the handle assembly 2 into a linear motive force and to transmit the motive force to the spool 5.

Sensor Unit

The sensor unit 6 is attached to the right side of the reel body 3 by the first handle mounting portion 20. However, as described above, in the right-handle mode, with the handle assembly 2 reattached, the second handle mounting portion 30 is used to attach the sensor unit 6 to the left side of the reel body 3.

As shown in FIGS. 3 and 4, the sensor unit 6 can be a behavior sensor that detects the behavior of the reel body 3 during use. The behavior of the reel body 3 during use refers to the movement (motion) of the reel body 3 that changes in accordance with an external force that acts on the reel body 3 or an operation from the user while fishing. Specifically, for example, the acceleration, velocity, or vibration that acts on the reel body 3 accompanying casting, the vibration that acts on the reel body 3 due to a strike, or handle rotation information such as handle rotation speed, handle rotational frequency, handle angular velocity, etc., accompanying an operation of the handle are included in the behavior according to the present invention.

In the present embodiment, an example is shown in which two sensors are used as behavior sensors: a rotary encoder 90 that detects the handle rotation information accompanying an operation of the handle and a three-axis acceleration sensor 91 that detects the acceleration that acts on the reel body 3.

However, the present invention is not limited to this configuration, and the behavior sensor may be appropriately selected in accordance with the behavior to be detected. In addition, the number of behavior sensors is not limited to two; one or three or more may be provided.

The sensor unit 6 primarily comprises a unit body 92 disposed coaxially with the handle axis O1; the above-described rotary encoder 90 and the three-axis acceleration sensor 91 disposed within the unit body 92; a communication unit (communicator) 93 that is disposed within the unit body 92 and that transmits behavior data (handle rotation data and acceleration data) to the outside based on behaviors (handle rotation information and acceleration) respectively detected by the rotary encoder 90 and the three-axis acceleration sensor 91; a data storage 94 that is disposed within the unit body 92 and that stores the handle rotation data and the acceleration data; a control board 96 on which is mounted a control unit 95, such as a CPU, not shown, and which is an arithmetic processing unit; and a power supply unit 97.

The unit body 92 includes a unit case 100 and a unit cap 110.

The unit case 100 has a partition wall portion 101 that is disposed on the right side of the first mounting cylinder 21 so as to close the first mounting hole 23 from the right side; a cylindrical peripheral wall portion 102 that extends from the partition wall portion 101 toward the right side; a connecting cylinder 103 that extends from the partition wall portion 101 toward the left side and that is screwed into the first mounting cylinder 21; and a surrounding cylinder 104, disposed coaxially to the handle axis O1, extending from the outer peripheral edge portion of the partition wall portion 101, and that surrounds the first mounting cylinder 21 from the outside in the radial direction.

The partition wall portion 101 can be in the shape of a disk with a diameter that is greater than the outer diameter of the first mounting cylinder 21 and is close to or in contact with the opening edge of the first mounting cylinder 21. The illustrated example shows the case in which the partition wall portion 101 is close to the opening edge of the first mounting cylinder 21.

The peripheral wall portion 102 has a two-stepped cylindrical shape that includes a large diameter portion 102a disposed on the partition wall portion 101 side and a small diameter portion 102b disposed on the right side of the large diameter portion 102a. The inner diameter of the large diameter portion 102a and the inner diameter of the small diameter portion 102b are formed to have the same diameter.

A sixth threaded portion 105 (for example, a female threaded portion) is disposed on the portion of the outer circumferential surface of the small diameter portion 102b positioned on the opening edge side of the small diameter portion 102b. In addition, the portion of the outer circumferential surface of the small diameter portion 102b positioned farther on the large diameter portion 102a side than the sixth threaded portion 105 includes a seal ring 106.

The interior of the peripheral wall portion 102 configured as described above constitutes a housing space 107 that houses various constituent components.

A seventh threaded portion 108 (for example, a male threaded portion) that is screwed into the first threaded portion 22 disposed in the first mounting cylinder 21 is disposed on the portion of the outer circumferential surface of the connecting cylinder 103 positioned on the opening edge side of the connecting cylinder 103. By connecting the seventh threaded portion 108 to the first threaded portion 22, the connecting cylinder 103 is integrally combined with the interior of the first mounting cylinder 21 by screwing.

As a result, the entire sensor unit 6 is attached to the reel body 3 so as to be non-rotationally fixed using the first handle mounting portion 20. The portion of the outer circumferential surface of the connecting cylinder 103 positioned farther on the partition wall portion 101 side than the seventh threaded portion 108 includes a seal ring 109.

The surrounding cylinder 104 surrounds the first mounting cylinder 21 from the outside in the radial direction, for example, in a state in which the opening edge is in contact with the right-hand side surface of the body frame portion 10. The inner circumferential surface of the surrounding cylinder 104 is close to or in contact with the outer circumferential surface of the first mounting cylinder 21. The illustrated example shows a configuration in which the inner circumferential surface of the surrounding cylinder 104 is close to the outer circumferential surface of the first mounting cylinder 21.

The unit cap 110 is a topped cylinder shape having a cap wall portion 111 and a cap tube portion 112, and is disposed coaxially to the handle axis O1.

The cap wall portion 111 is disk shaped with a diameter that is greater than the small diameter portion 102b of the unit case 100 and is close to or in contact with the opening edge of the small diameter portion 102b. The illustrated example illustrates a configuration in which the cap wall portion 111 is close to the opening edge of the small diameter portion 102b.

The cap tube portion 112 is a cylinder that extends from the outer peripheral edge portion of the cap wall portion 111 toward the left side and surrounds the small diameter portion 102b from the outside in the radial direction. An eighth threaded portion 113 (for example, a male threaded portion) that is screwed into the sixth threaded portion 105, which is disposed in the small diameter portion 102b, is disposed on the inner circumferential surface of the cap tube portion 112. By connecting the sixth threaded portion 105 and the eighth threaded portion 113, the unit cap 110 is integrally combined with the unit case 100 by screwing. The interior of the housing space 107 is sealed by screwing the unit cap 110 on the unit case 100.

The outer diameter of the cap tube portion 112 has the same diameter as the outer diameter of the large diameter portion 102a of the unit case 100. It is thereby possible to combine the unit cap 110 without forming a step from the unit case 100. However, the present invention is not limited to this configuration, and the outer diameter of the cap tube portion 112 can be larger than the outer diameter of the large diameter portion 102a of the unit case 100.

A sensor unit 90a that constitutes the rotary encoder 90, the three-axis acceleration sensor 91, the communication unit 93, the data storage 94, the control board 96, and the power supply unit 97 is arranged in the housing space 107 of the unit body 92. Of the foregoing, the sensor unit 90a, the three-axis acceleration sensor 91, the communication unit 93, the control board 96, and the power supply unit 97, which are primarily likely to require installation space, are arranged in a single line along the handle axis O1.

The rotary encoder 90 is an absolute type magnetic encoder. The rotary encoder 90 includes a magnetic body 90b that is attached to the drive shaft 51 that rotates along with the handle shaft 40 and whose S and N poles are alternately magnetized in the circumferential direction, and the sensor unit 90a, which is a magnetoresistive element whose resistance value changes in accordance with changes in the magnetic field.

The magnetic body 90b is attached to the drive shaft 51 via a connecting shaft portion 120 screwed inside the right-end portion of the drive shaft 51. A ninth threaded portion 121 (for example, a male threaded portion) is disposed on the outer circumferential surface of the connecting shaft portion 120 and screws into the third threaded portion 52 disposed in the drive shaft 51, and includes a shaft main body 122 that is screwed inside the right-end portion of the drive shaft 51 and a head portion 123 that is integrally formed with the shaft main body 122 and that is disposed on the right side of the right-end portion of the drive shaft 51.

The connecting shaft portion 120 can be rotated about the handle axis O1 together with the drive shaft 51 by screwing the shaft main body 122 inside the right-end portion of the drive shaft 51.

The head portion 123 is housed inside the connecting cylinder 103 in a non-contacting state with respect to the partition wall portion 101. Therefore, the unit body 92 is attached to the reel body 3 in a non-rotationally fixed manner without contact with the connecting shaft portion 120 and the drive shaft 51 that rotates together with the handle shaft 40.

The magnetic body 90b is integrally fixed to the head portion 123 by being embedded therein, for example. As a result, the magnetic body 90b can be rotated about the handle axis O1 together with the handle shaft 40 via the connecting shaft portion 120 and the drive shaft 51.

The sensor unit 90a is disposed within the housing space 107 in a state in which, for example, a portion thereof has entered the partition wall portion 101, and the resistance value changes in accordance with the changes in the magnetic field accompanying the rotation of the magnetic body 90b through the partition wall portion 101. Thus, based on the changes in the resistance value, the sensor unit 90a can detect the rotational state of the handle, such as the handle rotational frequency, rotational speed, and angular velocity.

The three-axis acceleration sensor 91 is a piezoresistive type or a capacitance type sensor, which can detect acceleration in three axial directions: the handle axis O1 direction, the spool axis O2 direction, and the vertical direction. The three-axis acceleration sensor 91 is disposed within the housing space 107 so as to be arranged on the right side of the sensor unit 90a of the rotary encoder 90.

The control board 96 on which the control unit 95 is mounted is disposed within the housing space 107 so as to be arranged on the right side of the three-axis acceleration sensor 91. The control unit 95 has for the capability to comprehensively control the operation of the sensor unit 6 and generates the handle rotation data and the acceleration data based on the detection results of the sensor unit 90a and the three-axis acceleration sensor 91.

The communication unit 93 is a wireless transmission module, for example, and is capable of wirelessly transmitting the handle rotation data and the acceleration data that are generated by the control unit 95 to the outside. The communication unit 93 is disposed within the housing space 107 in a state of being disposed between the control board 96 and the three-axis acceleration sensor 91.

The data storage 94, for example, a flash memory, etc., is mounted on the control board 96. A program or a table, for example, for causing the control unit 95 to execute various arithmetic processes is prestored in the data storage 94. Furthermore, the data storage 94 has the capability to store the handle rotation data and the acceleration data that are generated by the control unit 95.

An external connection terminal, not shown, is attached to the control board 96, such that the data storage 94 can be accessed from the outside via the external connection terminal.

The power supply unit 97 is a replaceable primary battery, such as a button battery, or a chargeable/dischargeable secondary battery 97a, 97b. In the present embodiment, two button-type (coin-type) secondary batteries 97a, 97b are provided as the power supply unit 97.

The two secondary batteries 97a, 97b are arranged side by side in the handle axis O1 direction and are electrically connected in series. The two secondary batteries 97a, 97b are electrically connected to the control board 96 via a terminal board, not shown, and supply electrical power to each constituent component of the sensor unit 6 through the control board 96.

Action of the Spinning Reel

The situation in which the spinning reel 1 with the above-described configuration is used will now be described.

When one casts, the bail arm 63 is dropped from the state shown in FIGS. 1 and 2 to a line-releasing position, and the fishing rod R is swung forward. The fishing line that is wound around the bobbin trunk 70 of the spool 5 can thereby be paid out forward.

Thereafter, when the fishing line is wound, the bail arm 63 is returned to the line-guiding position, as shown in FIGS. 1 and 2. The fishing line is thereby guided to the line roller 66 by the bail arm 63. In this state, a handle operation is carried out by rotating the handle assembly 2 about the handle axis O1 while the handle knob 43 is gripped.

Since the rotational force of the handle assembly 2 is transmitted to the rotor 4 by the rotor drive mechanism 50, it is possible to rotate the rotor 4 about the spool axis O2. At the same time, since the rotational force of the handle assembly 2 is transmitted to the spool 5 by the oscillation mechanism 80, it is possible for the spool 5 to move in reciprocating fashion along the spool axis O2. As a result, it is possible to rotate the rotor 4 while the spool 5 moves in reciprocating fashion in the longitudinal direction L2 and to wind the fishing line uniformly onto the bobbin trunk 70 of the spool 5 via the line roller 66.

In particular, since the spinning reel 1 of the present embodiment is equipped with the sensor unit 6, it is possible to detect the above-described handle rotation information and the three-axis acceleration during fishing with the rotary encoder 90 and the three-axis acceleration sensor 91. Then, based on the detection results of the rotary encoder 90 and the three-axis acceleration sensor 91, it is possible to transmit the handle rotation data and the acceleration data, which are generated by the control unit 95, to the outside by the communication unit 93. It is thereby possible to transmit the handle rotation data and the acceleration data to an external device such as a mobile terminal in real time as one fishes.

Furthermore, since the handle rotation data and the acceleration data can also be stored in the data storage 94, for example, even after one stops fishing, the handle rotation data and the acceleration data can be acquired by an external device by removing the sensor unit 6 from the reel body 3 and accessing the data storage 94.

In this embodiment, for example, it is possible to access the data storage 94 via the external connection terminal by removing the two secondary batteries 97a, 97b after the unit cap 110 is removed.

Thus, it is possible to accumulate the handle rotation data and the acceleration data by using, for example, an external device, or the like, and to objectively ascertain the behavior of the reel body 3 by carrying out an analysis, or the like, as required.

For example, it is possible to ascertain the release speed, the release distance, etc., of the fishing line at the time of casting based on the acceleration data. In addition, it is possible to ascertain whether there was a rotational irregularity in the handle rotation operation, and to ascertain the handle operation habits, operating tendencies, etc., of the user based on the handle rotation data. Furthermore, based on the handle rotation data and the acceleration data, it is possible to ascertain what types of handle operations led to strikes, etc., and to ascertain correlations between strikes and handle operations, etc.

In this manner, since the behavior of the reel body 3 can be objectively ascertained, and, for example, utilized during subsequent fishing. When the handle rotation data and the acceleration data are analyzed, the analysis can be carried out using, for example, a dedicated application, or the like, installed on an external device.

As described above, the spinning reel 1 of the present embodiment can be a reel that includes a sensor unit 6 attached to the reel body 3. In particular, since the sensor unit 6 itself can be disposed on the handle axis O1, the behavior accompanying the handle operation can be suitably detected, and it is a simple matter to detect rotational irregularities, etc., with high accuracy.

Furthermore, since the sensor unit 90a, the three-axis acceleration sensor 91, the communication unit 93, the control board 96, and the power supply unit 97, which are primarily likely to require installation space, are arranged in a single line along the handle axis O1, it is possible to prevent the enlargement of the unit body 92, which houses these components, in a radial direction intersecting the handle axis O1.

Thus, as shown in FIG. 1, it is possible suitably to prevent the sensor unit 6 from interfering with the other constituent components (rotor 4, etc.) of the spinning reel 1.

In addition, since it is possible to attach the sensor unit 6 by using the handle mounting portion (first handle mounting portion 20 or second handle mounting portion 30) for mounting the handle assembly 2 on the reel body 3, it is not necessary to add a special structure on the reel body 3 side.

Thus, for example, it is possible to utilize an existing reel body, so that it is possible to improve convenience of use and easily reduce the cost.

In addition, since it is possible to attach the sensor unit 6 to the reel body 3 so as to be non-rotationally fixed, one may fish without worrying about the sensor unit 6. Moreover, since it is difficult for centrifugal force and other stresses that accompany the operation of the handle to act on each of the components inside the unit body 92, long-term stable operating reliability can be ensured.

Second Embodiment

A second embodiment of the fishing reel according to the present invention will now be described with reference to the drawings. In this second embodiment, the portions that are the same as compositional elements of the first embodiment have been assigned the same reference symbols, and their descriptions have been omitted.

In the first embodiment, the sensor unit 6 is attached to the reel body 3 so as to be non-rotationally fixed, but in the present embodiment, a sensor unit is attached so as to be rotatable relative to the reel body 3.

Figure 5:
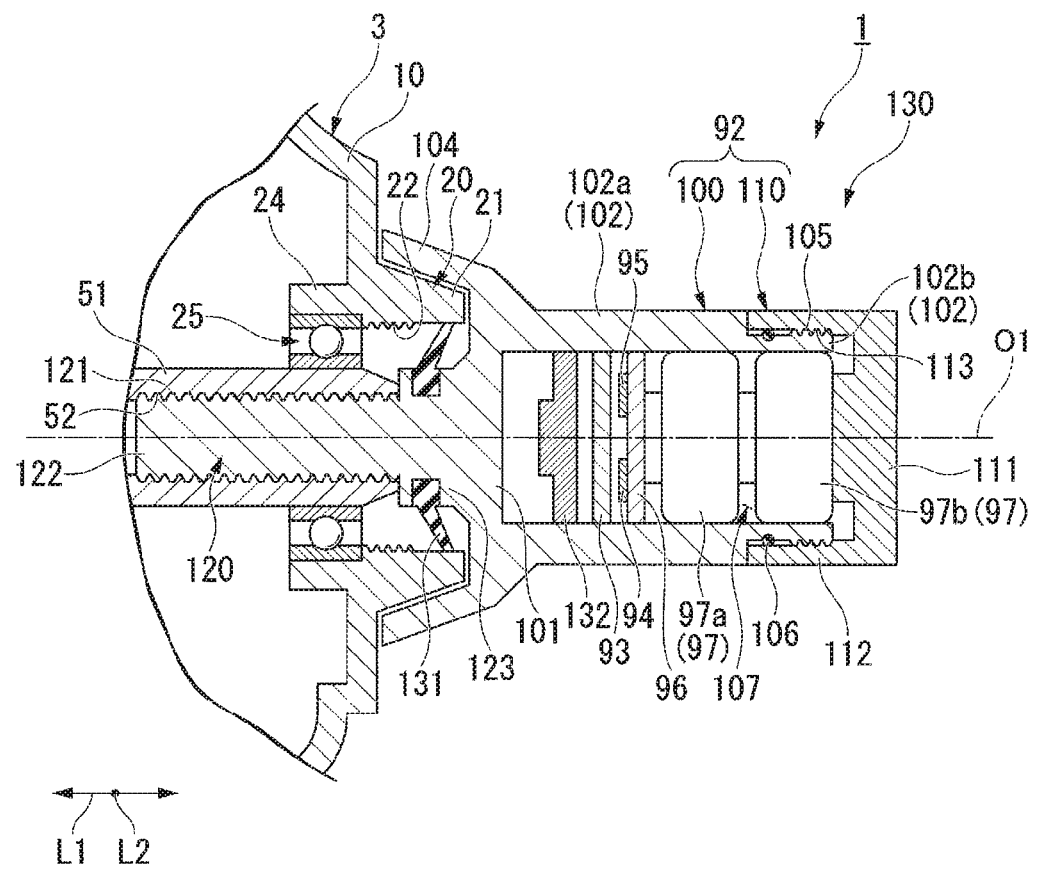
FIG. 5 is an enlarged cross-sectional view of the periphery of a sensor unit of a spinning reel according to a second embodiment of the present invention.

As shown in FIG. 5, the spinning reel 1 according to the present embodiment comprises a sensor unit 130 that is connected to the handle shaft 40 via the drive shaft 51.

In the sensor unit 130 according to the present embodiment, the head portion 123 of the connecting shaft portion 120 and the partition wall portion 101 are integral, while the connecting cylinder 103 of the first embodiment is not provided. As a result, it is possible to integrally combine the entire sensor unit 130 with the handle shaft 40 via the drive shaft 51 by threading the ninth threaded portion 121 of the connecting shaft portion 120 into the third threaded portion 52 formed in the drive shaft 51. In other words, the sensor unit 130 can be attached so as to rotate relative to the reel body 3.

Thus, the sensor unit 130, accompanying an operation of the handle, can rotate about the handle axis O1 together with the handle shaft 40 and the drive shaft 51. An annular sealing plate 131 having outer circumferential surface that comes into close contact with the inner circumferential surface of the first mounting cylinder 21 is attached to the head portion 123.

A six-axis inertial sensor 132 is disposed within the housing space 107 of the sensor unit 130 as the behavior sensor. The six-axis inertial sensor 132 is disposed farther on the partition wall portion 101 side than the communication unit 93. Accordingly, in the present embodiment, the six-axis inertial sensor 132, the communication unit 93, the control board 96, and the power supply unit 97, which are primarily likely to require installation space, are arranged in a single line along the handle axis O1.

The six-axis inertial sensor 132 is a sensor that combines a gyro sensor, not shown, which detects the rotation information of the sensor unit 130, and an acceleration sensor, not shown, which can detect acceleration in three axial directions: the handle axis O1 direction, the spool axis O2 direction, and the vertical direction.

As described above, since the sensor unit 130 rotates about the handle axis O1 together with the handle shaft 40, the gyro sensor can detect the handle rotation information, such as the handle rotational frequency, rotational speed, and angular velocity.

Thus, in present embodiment, the handle rotation information and the acceleration can be detected by using the six-axis inertial sensor 132, in the same manner as the first embodiment.

Action of the Spinning Reel

In this embodiment of the spinning reel 1, it is possible to achieve the same action and effect as the first embodiment.

In addition, in the this embodiment, since, accompanying an operation of the handle, the sensor unit 130 itself can rotate, the behavior accompanying an operation of the handle can be easily and suitably detected by using the six-axis inertial sensor 132.

Whereas embodiments of the present invention have been described, these embodiments have been presented only as examples and are not intended to limit the scope of the invention. The embodiments may be implemented in a variety of other forms; furthermore, various omissions, substitutions and changes may be made without departing from the essence of the invention. Embodiments and modifications thereto include those that can be easily conceived of by a person skilled in the art, those that are substantially the same, and those that are of equivalent scope.

For example, in the embodiments described above, a spinning reel is described as an example of a fishing reel, but the present invention is not limited to a spinning reel and may be other types of reels. For example, the present invention can be applied to a single-bearing reel or a dual-bearing reel (including an electric reel). At this time, the sensor unit may be attached to the reel body in any manner as long as the sensor unit is disposed coaxially to the handle axis.

However, it is more preferable to attach the sensor unit by using the handle mounting portion (first handle mounting portion and second handle mounting portion) of the spinning reel, as in the embodiments described above, since the existing reel body 3 can be used.

Furthermore, in the above-described embodiments, the sensor unit was described as an example in which, in the unit body, in addition to the behavior sensor (rotary encoder, three-axis acceleration sensor, six-axis inertial sensor) and the communication unit, the data storage and the power supply unit are provided, but the data storage and the power supply unit are not essential and may be omitted.

Even when the data storage is not provided, the same action and effect can be achieved because the behavior data can be transmitted to the outside by the communication unit. In addition, even when the power supply unit is not provided, for example, if the reel body side has a power source, the sensor unit may be configured to be supplied with electrical power from said power source.

What is claimed is:

1. A fishing reel, comprising:
   a reel body having a handle configured to be rotated about a handle axis;
   a spool capable of being rotated by the handle to wind fishing line around the spool; and
   a sensor unit attached to the reel body,
   the sensor unit including
   a unit body disposed coaxially with the handle axis,
   a behavior sensor disposed within the unit body and configured to detect the behavior of the reel body during use, and
   a communicator disposed within the unit body and configured to transmit behavior data externally relative to the unit body based on the behavior detected by the behavior sensor.

2. The fishing reel according to claim 1, wherein the sensor unit further includes a data storage disposed within the unit body and is configured to store the behavior data.

3. A fishing reel, comprising:
a reel body having a handle configured to be rotated about a handle axis; and
a sensor unit attached to the reel body,
the sensor unit including
a unit body disposed coaxially with the handle axis,
a behavior sensor disposed within the unit body and configured to detect the behavior of the reel body during use, and
a communicator disposed within the unit body and configured to transmit behavior data externally relative to the unit body based on the behavior detected by the behavior sensor,
the behavior sensor and the communicator arranged so as to be aligned along the handle axis.

4. A fishing reel, comprising:
a reel body having a handle configured to be rotated about a handle axis;
a sensor unit attached to the reel body,
the sensor unit including
a unit body disposed coaxially with the handle axis,
a behavior sensor disposed within the unit body and configured to detect the behavior of the reel body during use, and
a communicator disposed within the unit body and configured to transmit behavior data externally relative to the unit body based on the behavior detected by the behavior sensor; and
first and second handle mounting portions to mount the handle disposed on the reel body so as to be open toward the outside, coaxially to the handle axis, and
the unit body being attached to the reel body by one of the first and second handle mounting portions, and
the handle being attached to the reel body by an other one of the first and second handle mounting portions.

5. The fishing reel according to claim 4, wherein
the handle has a handle shaft supported by the reel body so as to be rotatable about the handle axis, and
the unit body is attached to the reel body so as to be non-rotationally fixed via the one of the first and second handle mounting portions, in a state in which the unit body is not in contact with the handle shaft.

6. The fishing reel according to claim 4, wherein
the handle has a handle shaft supported by the reel body so as to be rotatable about the handle axis, and
the unit body includes a connecting shaft portion connected to the handle shaft via the one of the first and second handle mounting portions, and is attached to the reel body so as to be non-rotationally fixed.

* * * * *